BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 41

T858,001

558,996

BONDED NON-WOVEN FABRIC

Ronald Philip Smyser, Wilmington, Del., assignor to E. I. du Pont de Nemours and Company, Wilmington, Del., a corporation of Delaware

Filed June 20, 1966. Published Jan. 7, 1969

Class 161—170

1 Sheet Drawing. 14 Pages Specification

A bonded nonwoven fabric particularly useful as nonwoven interlinings for durable press fabrics, comprising randomly arranged, synthetic organic fibers having at least 5 crimps per inch of unextended length, said fibers being bonded together by a combination of binders, one binder comprising from about 5 to 15% by weight of a thermoplastic fiber-forming polymer and the other binder comprising either from about 10 to 25% by weight of a cross-linked acrylic resin having a modulus of 20 to 500 kg./cm.$^2$ at 20° C. or from about 5 to 15% by weight of a cross-linked acrylic resin having a modulus of 500 to 6000 kg./cm.$^2$, the combined weight of the binders being between 10 and 40% and said bonded web exhibiting a free fiber length of from 1.05 to 1.25. The fibers may be staple or continuous and are preferably composed of poly(hexamethylene adipamide), polycaproamide or poly(ethylene terephthalate).

United States Patent Office

PTO - BOYERS, PA Duty Station

MISSING PAGE TEMPORARY NOTICE

PATENT # T858001 FOR ISSUE DATE 1-07-1969

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Drawing Sheet 1

N/A at Boyers
6/1/94

Data Conversion Operation

Boyers, Pa